United States Patent
Dunn et al.

(10) Patent No.: US 7,499,691 B1
(45) Date of Patent: Mar. 3, 2009

(54) SYSTEMS AND METHODS FOR SELECTING AN ANTENNA CONFIGURATION IN A MOBILE COMMUNICATION DEVICE

(75) Inventors: Doug Dunn, Chula Vista, CA (US); Henry Chang, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 542 days.

(21) Appl. No.: 11/289,061

(22) Filed: Nov. 29, 2005

(51) Int. Cl.
*H04B 1/06* (2006.01)
*H04Q 7/20* (2006.01)

(52) U.S. Cl. .................................. 455/277.2; 455/101
(58) Field of Classification Search ................. 455/101, 455/277.1, 277.2; 375/267, 299, 347
See application file for complete search history.

(56) References Cited

U.S. PATENT DOCUMENTS

2002/0058488 A1* 5/2002 Miyahara ................. 455/277.2
2007/0037538 A1* 2/2007 Shatara et al. ........... 455/277.2

* cited by examiner

*Primary Examiner*—Lee Nguyen (57) ABSTRACT

An improved smart antenna reception method and devices are provided that determine when to select a new antenna configuration in a multiple antenna configuration system. One embodiment attempts to eliminate unneeded configuration searching. Unneeded configuration searching can degrade overall signal quality and system performance. Configuration changing can be minimized by determining that a signal quality received from a first antenna configuration is below a threshold and changing antenna configuration. After changing antenna configuration, if the signal quality received from the second antenna configuration is lower than the signal quality received from the first antenna configuration the threshold can be lowered. By lowering the threshold, the probability of additional configuration changing can be reduced.

22 Claims, 6 Drawing Sheets

SYSTEMS AND METHODS FOR SELECTING AN ANTENNA CONFIGURATION IN A MOBILE COMMUNICATION DEVICE

FIELD OF THE INVENTION

The present invention relates generally to mobile communication devices, and more particularly to selecting antenna configurations in a mobile communication device.

BACKGROUND OF THE INVENTION

Users of mobile communication devices, such as cellular telephones, Personal Digital Assistants (PDAs) or laptop computers that include wireless capability, etc., often experience performance problems, such as dropped calls, poor call quality, and an inability to connect with the network. Such problems are often the result of interference from other wireless signals in the area. Additionally, however, such problems are often the result of what is called multipath interference.

The term multipath is a term that describes how a signal transmitted in a wireless environment travels along multiple paths from the transmission source to the destination or receiver. For example, when a base station transmits a signal to a mobile communication device, the energy comprising the signal spreads out. Some of the energy can travel along a direct line to the mobile communication device. This direct line is one path. Some of the energy can, e.g., reflect off a building and then reach the mobile communication device. The reflected signal path being a second path. Similarly, some of the energy can reflect off other buildings, mountains, or other structures before reaching the mobile communication device. The different paths traveled by the signal energy from the base station to the mobile device are referred to as multipaths, and the associated signal energies are referred to as the multipath signals, or sometimes multipath for short.

The multipath signals combine with each other in the mobile communication device receiver. At times the multipath signals will combine constructively, but at other times the signals will combine destructively, i.e., the signals will combine in such a manner that they at least partially cancel each other out, or interfere with each other. This is because the multipath signals can be out of phase with each other due to the different lengths of the paths traveled. Destructive multipath combining, or interference, can lower the signal-to-noise ratio in the receiver, and affect other signal parameters, causing the problems referred to above. Such destructive multipath interference is often referred to as fading, i.e., it causes the signal as seen by the mobile communication device receiver to fade out.

Spatial diversity has been used to combat the problem of destructive multipath interference, or fading. In its simplest form, spatial diversity comprises two antennas spaced a certain distance apart. The distance between the antennas should be related to the wavelength of the signal being received, e.g., a multiple or sub-multiple of the wavelength. The idea of spatial diversity is that the distance between the antennas allows each antenna to receive samples of the signal independent of the other antenna. While the signal at one antenna might be experiencing destructive interference, the signal at the other might be experiencing constructive interference.

The difference in position of the antennas will affect the phase of the multipath signals. The effect of the different path lengths can affect the phase of the multipath signals enough such that multipath signals that would have combined destructively at the first antenna, will now combine constructively at the second antenna. Thus, spatial diversity can improve performance and help overcome, e.g., the problems referred to above. Moreover, spatial diversity can extend to any number of antennas.

A mobile communication device can, therefore, be configured with a plurality of antennas and a means for changing between antennas when the received signal quality is degraded beyond a certain point, which can for example be measured in terms of received signal power. Accordingly, the mobile communication device can be configured to monitor the signal power of a signal received using a first antenna of a plurality of antennas. When the received signal power drops below a certain threshold, then the device can be configured to switch to another antenna that exhibits higher received signal power.

Since mobile communications devices are typically not large enough to implement true spatial diversity, polarization diversity can be implemented in order to improve performance in a mobile communication device. The polarization diversity case is similar to the spatial diversity case. Whereas spatial diversity relies on the separation of the antenna to get independent samples, polarization diversity relies on the different polarizations. For example a vertically polarized antenna will tend to see vertically polarized signals and tend to reject horizontally polarized signals; therefore, samples from a vertically polarized antenna will tend to be independent from samples from a horizontally polarized antenna. Spatial diversity can also be combined with polarization diversity, as in the case where a vertically polarized antenna and a horizontally polarized antenna are included in the same device. Because the two antennas are typically located at different locations within the device, they will exhibit at least some degree of spatial diversity.

Thus, a plurality of antennas can be incorporated into a communication device that comprises spatial diversity, polarization diversity, or both, such that the device can switch between different antennas and/or different polarizations in order to attempt to improve the received signal quality.

A smart antenna system is an antenna system that is capable of steering the antenna beam or is capable of beam forming. Examples of types of smart antennas would include a single active element with parasitic elements. By modifying the characteristics of the parasitic elements the beam can be steered, shaped, or both. Another example smart antenna can include multiple active elements where the phase of the signal between the elements can be changed to cause the beam to steer or change shape. Alternatively, a smart antenna can include multiple active elements that allow the signals to be applied to each independently and weighted to steer or form the beam. Processing for these smart antennas can, for example, be done in DSP.

In conventional devices, the device must check each antenna to determine if there is an antenna with better signal quality than the current configuration. Unfortunately, this can actually degrade device performance even further, since often many if not all of the other configuration will have worse signal quality than the current configuration. Thus, the device can spend significant time searching configuration that actually have worse performance than the current configuration, which degrades the device's overall performance during the searching period.

SUMMARY OF THE INVENTION

A mobile communication device comprising a plurality of antenna configurations is configured to selectively search the plurality of antenna configurations in order to reduce the likelihood that an antenna configuration exhibiting worse received signal quality than a current configuration will be searched, when the signal quality for the current configuration drops below a certain threshold. A threshold is associated with each configuration. Accordingly, when the signal quality for the current configuration drops below a certain threshold, then other configurations will be searched to determine if they exhibit better signal quality. If the searched configurations actually exhibit lower signal quality, then the threshold for this configuration can be altered making it less likely that the configuration will be searched in the future.

These and other features, aspects, and embodiments of the invention are described in greater detail below.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION

Figure 1:
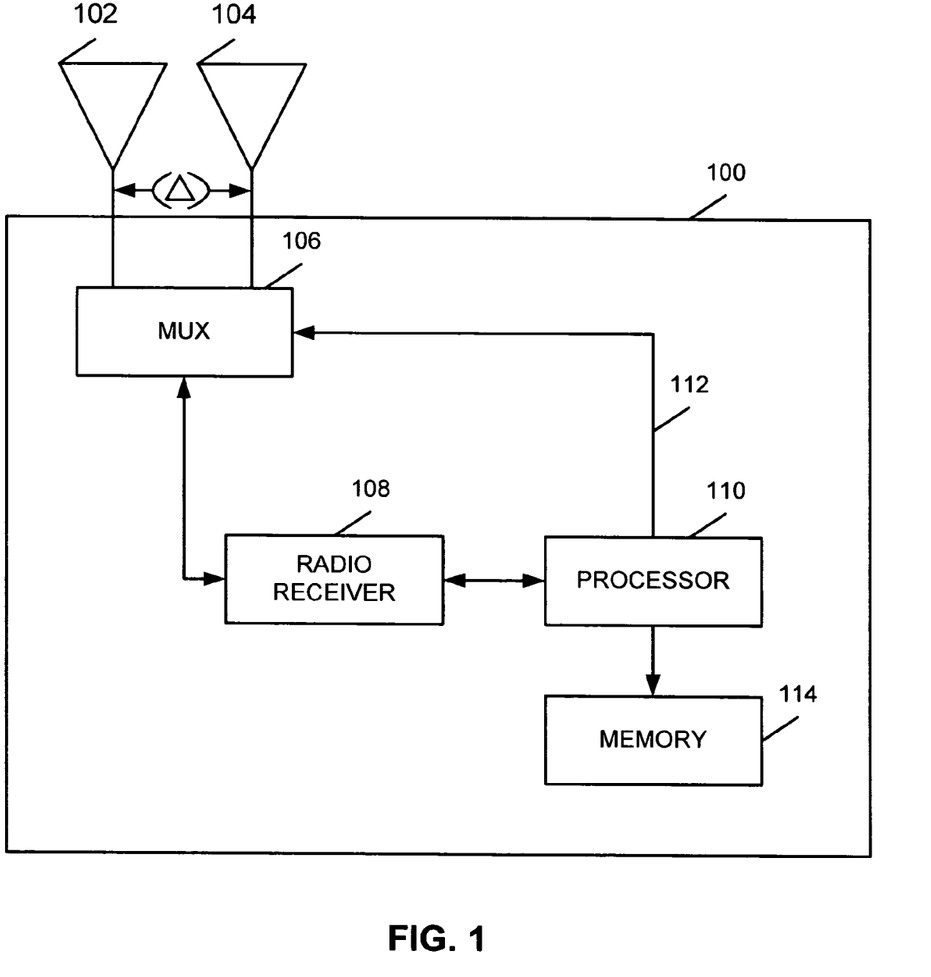
FIG. 1 is a diagram illustrating an example mobile communication device configured in accordance with one embodiment.

FIG. 1 is a diagram illustrating an example mobile communication device 100 configured in accordance with one embodiment of the systems and methods described herein. For purposes of this discussion, it is assumed that mobile communication device 100 is a cellular telephone; however, it will be understood that the systems and methods described herein can apply to other types of mobile communication devices, such as PCS telephones, PDAs or laptops with wireless capability, or any other type of mobile communication device that uses an antenna to receive wireless signals.

Wireless communication device 100 comprises a plurality of antennas. For ease of discussion, wireless communication device 100 is shown to comprise two antennas 102 and 104; however, it will be clear, and will be discussed in more detail below, that any number of antennas can be included in device 100. Antennas 102 and 104 are configured to transmit and receive wireless signals. Antennas 102 and 104 are illustrated extending external to device 100. In other embodiments, however, one or both antennas can be internal to device 100. Further, as can be seen, antennas 102 and 104 are separated by space (A). Depending on the embodiment, (A) can be a multiple or sub-multiple of the wavelength of the wireless signals received by antennas 102 and 104.

Antennas 102 and 104 are interfaced with a switch, or multiplexer (MUX) 106. MUX 106 is configured to interface one of antennas 102 or 104 with radio receiver 108, depending on the position, or settings, of MUX 106. The settings of MUX 106 are controlled by processor 110 as described below.

Radio receiver 108 comprises the functional components required to receive wireless radio signals via antennas 102 and 104. Thus, radio receiver 108 can comprise the circuits required to convert a radio signal received via antennas 102 or 104 into a baseband signal that can be processed by processor 110. It will be apparent that device 100 can also comprise a radio transmitter (not shown) that can comprise the circuitry necessary to convert a baseband signal produced by processor 110 into a radio signal that can be transmitted by antennas 102 or 104. Such a radio transmitter may or may not be interfaced with MUX 106. In general, it will be clear that device 100 comprises other known functional components, which will not be described here for the sake of brevity; however, the components illustrated in FIG. 1 should not be seen as limiting the embodiments described herein to any particular functional architecture or configuration.

Processor 110 comprises the functional components necessary to encode baseband signals for transmission and decode baseband signals received and produced by radio receiver 108. In addition, processor 110 can comprise the functional components necessary to control the operation of device 100. Thus, processor 110 can comprise the required hardware and software for performing the tasks described below, in particular controlling MUX 106. Processor 110 can actually comprise multiple devices and/or processing circuits, such as Digital signal Processors (DSPs), audio processors, math coprocessors, microcontrollers, microprocessors, etc.

Device 100 also comprises memory 114 configured to store instructions that can be accessed by processor 110. The instructions provide processor 110 with the instructions needed to control the operation of device 100 and perform the operations described below. Memory 114 can also be configured to store temporary and permanent date used by processor 110 to carry out the instructions stored in memory 114.

Memory 114 can actually comprise multiple memory devices. For example, a typical cellular telephone comprises a Flash based memory device for storing operating instructions as well as a Static RAM (SRAM) device for storing variables and data required by the instructions. Cellular telephones will also often comprise an Electrically Erasable and Programmable ROM (EEPROM) device. All or some of these multiple memory devices can be incorporated into a single device or package. For example, in cellular telephones, the Flash and SRAM are often integrated into a single package. Alternatively, some or all of the memory devices can be included in separate devices or packages.

Processor 110 can be configured to monitor the quality of signals received via antennas 102 or 104 and radio receiver 108 and determine when the quality has dropped below a preferred threshold. When the signal quality drops below the preferred threshold, processor 110 can be configured to cause MUX 106 to switch from the antenna that is currently interfaced with radio receiver 108 to the other. Processor 110 can then check the signal quality for signals received by this antenna in order to determine whether the signal quality is better for this antenna than the previous one.

Figure 2:
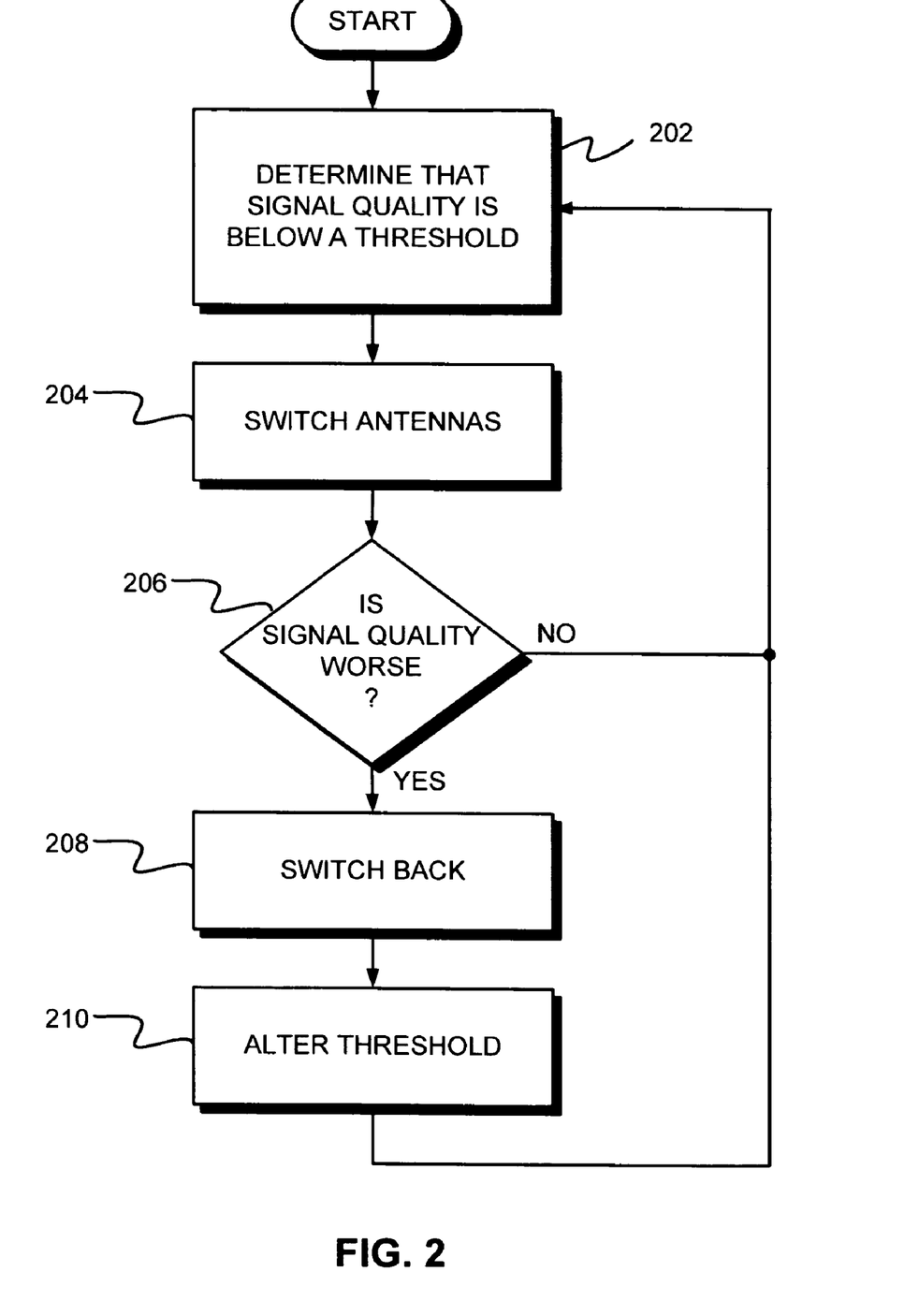
FIG. 2 is a flowchart illustrating an example method for changing antenna configurations using the mobile communication device of FIG. 1.

This process is described for the simple example of two antennas in the method of FIG. 2. It should be noted than in addition to being spatially diverse, antennas 102 and 104 can also comprise different polarizations. The combination of position and polarization can be referred to as an antenna configuration. Thus, when processor 110 causes MUX 106 to switch, the switch can be referred to as a switch from one antenna configuration to another. Thus, the term antenna configuration will be used in the following discussion; however, this should not be seen as excluding the situation where the two antennas are simply spatially diverse. Further, while antenna configurations can include discrete configurations, i.e., changing from one discrete configuration to another, as in the example above, antenna configurations can also be ranges of solutions. For example, in one embodiment an antenna pattern can be shaped such that the antenna pattern can be pointed in any direction, not just some number of predetermined directions, by adjusting the relative phase between the antenna elements. In this embodiment, MUX 106 can be replaced by an antenna configuration control. The antenna configuration control can steer or point the antenna or select an antenna configuration from a plurality of antenna configurations.

In the process of FIG. 2, it will be assumed that device 100 is using antenna 102 to receive wireless signals. In step 202, processor 110 determines that the signal quality for signals being received via antenna 102 is below a threshold. In step 204, processor 110 can control MUX 106, via control line 112, to switch from the antenna configuration of antenna 102 to the configuration of antenna 104. Once the switch has occurred, processor 110 can assess, in step 206, whether the signal quality for signals being received using the configuration of antenna 104 is worse than the signal quality for signals received using the antenna configuration of antenna 102.

If the signal quality is not worse, i.e., the signal quality for the new configuration is better than of the old configuration, then processor 110 can be configured to continue the use of the new configuration, i.e., configuration 104. The process can then start over, with processor 110 determining whether the received signal quality using configuration 104 drops below a certain threshold in step 202. If on the other hand, the signal quality for configuration 104 is worse than the signal quality for configuration 102, then processor 110 can control MUX 106 via control line 112 to switch back to the configuration of antenna 102.

Once processor 110 has caused MUX 106 to switch back, processor 110 can update the threshold used in step 202. For example, the threshold can be a value or set of values stored in memory 114. Processor 110 can, for example, lower the threshold being used in step 202. The lower threshold should make it less likely that processor 110 will cause the antenna configuration to switch in step 204, because the signal quality will be less likely to drop below the new threshold. Once the threshold is altered in step 210, then the process can revert to step 202, where processor 110 can determine whether the signal quality for signals received via antenna configuration 102 has dropped below the new threshold.

It will be clear that different thresholds can be used and that in some embodiments, processor 110 will be checking, in step 202, to determine whether a threshold has been exceeded. Further, processor 110 can be configured to raise such a threshold in step 210.

Processor 110 can be configured to determine signal quality using a variety of parameters and/or combination of parameters. As mentioned above, receive signal strength or power can be used by processor 110 in step 202. In addition, however, other parameters such as signal-to noise ratio, Signal Error Rate (SER), Bit Error Rate (BER), Frequency Error Rate (FER), or some subset or combination thereof can be used. Processor 110 can be configured to determine such parameters internally. In other embodiments, such parameters can be determined external to processor 110, e.g., in radio receiver 108, and communicated to processor 110.

The amount of time that device 100 spends changing antenna configurations and checking signal quality for the new configuration is reduced, by altering the threshold in step 210 to make it less likely that processor 110 will determine that the threshold has been crossed in step 202. This can result in improved performance, since it has already been determined in step 206 that the alternative antenna configuration is actually experiencing worse signal conditions. In effect, the process of FIG. 2 adds hysteresis to the changing process to avoid the condition where processor 110 is constantly causing the antenna configuration to be switched back and forth.

In certain embodiments, device 100 can also include a timer that can be used to define a time period for which the altered threshold of step 210 will be used. Since device 100 is a mobile device and will often be moving, the signal conditions for the various antenna configurations will likely change over time and the signal conditions for the alternative antenna configuration, or configurations, can become better. Using a timer ensures that these other configurations are checked at least periodically. Other embodiments that use a timer, or timers, will be discussed more fully below.

Figure 3:
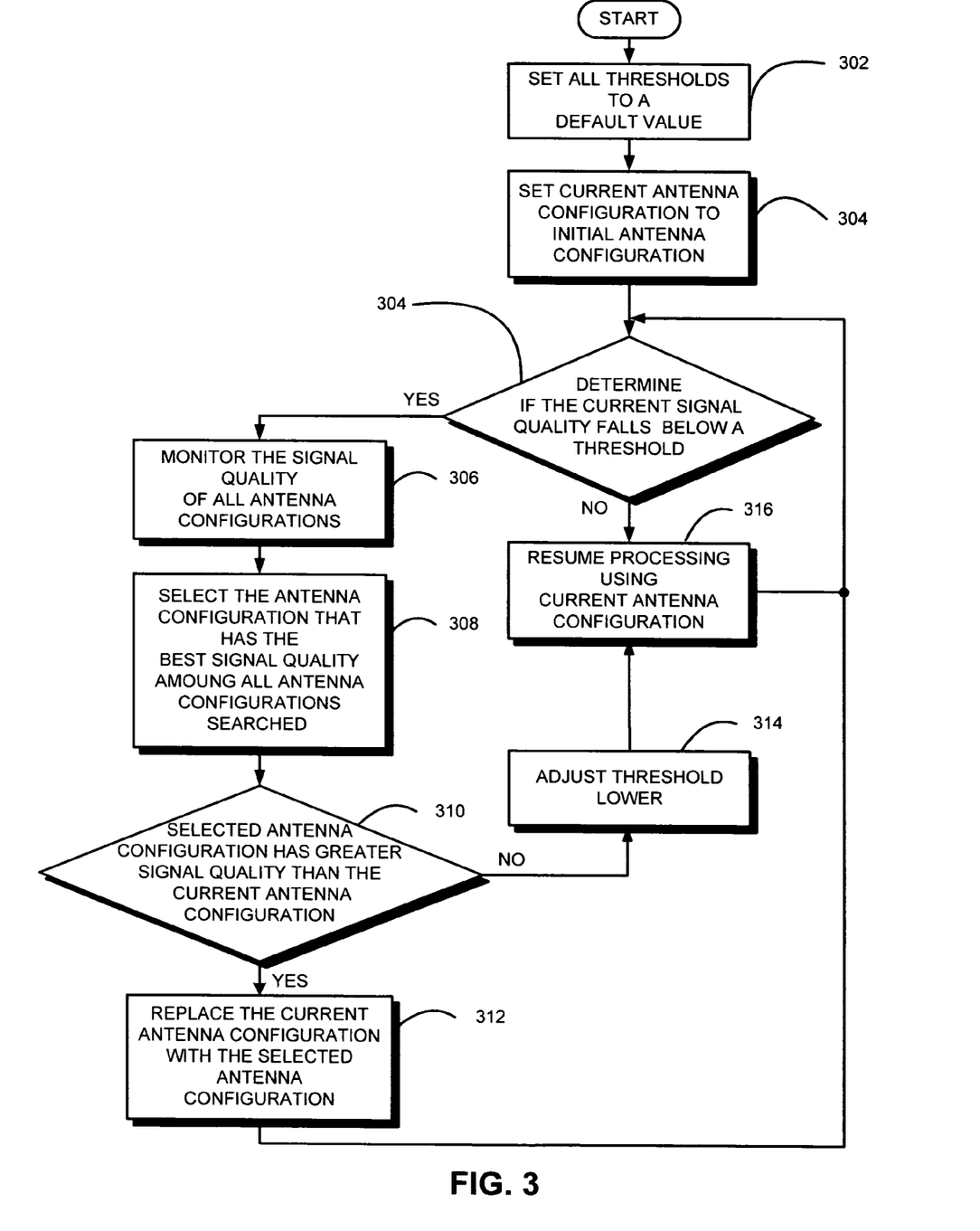
FIG. 3 is a flow chart illustrating another example method for changing antenna configurations using the mobile communication device of FIG. 1.

FIG. 3 is a flowchart illustrating an example method for changing antenna configurations in a mobile communication device with multiple antennas in accordance with one embodiment of the systems and methods described herein. Here, threshold values are set to default values in step 302. The default values can, for example, be predetermined and preset when the communication device is manufactured. Such preset values can then be stored, e.g., in memory 114. In step 304, processor 110 can be configured to select an initial antenna configuration. Processor 110 can be configured to then monitor the received signal quality and determine whether it falls below a threshold in step 304. If the current signal quality is not below the threshold, then the process can revert to step 304 in which processor 110 continues to monitor the received signal quality.

When the signal quality for the current antenna configuration falls below a threshold value, then processor 110 can be configured to cause MUX 106 to switch to each of the alternate antenna configurations in succession and to check the received signal quality for each alternate antenna configuration in step 306. The antenna configuration with the best signal quality among the antenna configurations searched can then be selected in step 308. In step 310, processor 110 can be configured to determine whether the selected configuration has better or worse signal quality than the original configuration. If the signal quality for the selected configuration is worse than the signal quality for the original configuration, then in step 314, processor 110 can lower the threshold used in step 304 and cause the original antenna configuration to be maintained in step 316.

Lowering the threshold will reduce the likelihood that processor 110 will cause the other antenna configurations to be searched. Again, this can actually improve performance, since it has already been determined that all other configurations have worse signal quality than the current configuration. In other embodiments, some of which are discussed below, multiple thresholds can be used and altered to reduce the likelihood that some groups of antenna configurations will be searched more, while maintaining the same likelihood for other groups, or altering the likelihood for other groups differently.

In step 312, processor 110 can cause the selected configuration to replace the current configuration when it is determined that the signal quality for the selected configuration is better than the signal quality for the current configuration. The process can then resume at step 304 where processor 110 can monitor the signal quality for the new configuration to determine whether it drops below the threshold. It should be noted that in addition to improving receiver performance, the improved receiver performance can also improve the forward link system capacity by reducing the base station resources allocated to each mobile. Additionally, in wireless systems, mobile communication devices are often handed off from one base station to another as they move throughout the system. In one embodiment, the threshold values can be reset, e.g., to a default value, each time a device undergoes such a handoff. In certain embodiments, the default values for each base station can actually be downloaded to the device upon handoff. In other embodiments, the default values can simply be stored and maintained on the device, e.g., in memory 114.

Figure 4:
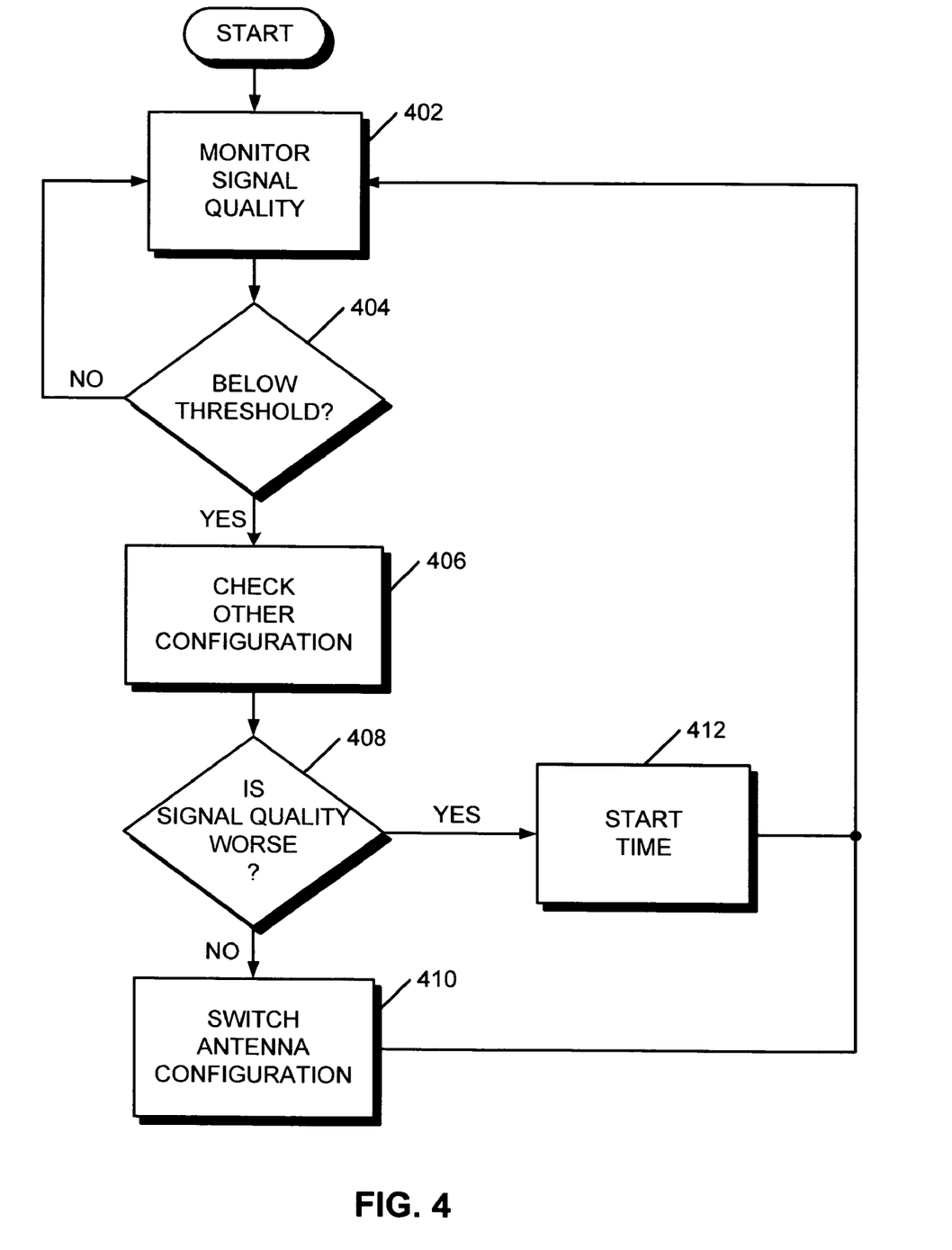
FIG. 4 is a flowchart illustrating an example method for changing antennas in the mobile communication device of FIG. 1 that uses timers in accordance with one embodiment.

FIG. 4 is flow chart illustrating an example method for selecting an antenna configuration that uses timers in accordance with the systems and methods described above. The use of a timer, or timers, was briefly referred to above. As with the methods of FIGS. 2 and 3, the method FIG. 4 begins in step 402 with the signal quality for signals being received using a current antenna configuration being monitored, e.g., by processor 110. Processor 110 then determines whether the signal quality has dropped below a certain threshold in step 404. If the signal quality is not below the threshold, then processor 110 can continue to monitor the signal quality in step 402.

If, on the other hand, the signal quality has dropped below the threshold, then in step 406, processor 110 can select another antenna configuration in step 406 to determine, in step 408, whether the other configuration provides better or worse signal quality. If the other configuration exhibits better signal quality, then in step 410 processor 110 can switch to the other antenna configuration and the process can continue in step 402.

If the signal quality for the other antenna configuration is worse than the signal quality for the original antenna configuration, as determined in step 408, then processor 110 can activate a timer in step 412. The process will then continue on step 402 with the signal quality for the original antenna configuration being monitored and other antenna configurations being selected (step 406) when the signal quality drops below the threshold (step 404); however, once the timer is activated, in step 412, then the associated antenna configuration, which was selected in step 406 and determined to provide worse signal quality in step 408, can be excluded from the process for the time period defined by the timer. Use of the timer will ensure that the associated antenna configuration is not searched for at least the time period defined by the timer. This can improve receiver performance, since it has already been determined that the antenna configuration does not improve signal quality. If each configuration is associated with a timer, then other antenna configuration will not be affected. Thus, they can continue to be searched unless it is determined that these other configurations provide worse signal quality. Alternatively, the antenna configuration with the best signal quality can be selected in step 406. In such embodiments, if it is determined that the signal quality for this antenna configuration is worse than the signal quality for the original antenna configuration, then the timer can be used to prevent any of the antenna configurations from being selected for the period defined by the timer, since it has been determine that none of them exhibit better signal quality than the current configuration. In still another embodiment, a group, or groups of antennas can be excluded for the time period defined by the timer, while others are not. Obviously, the timer, or timers can be configured to count up or down, depending on the embodiment.

Figure 5:
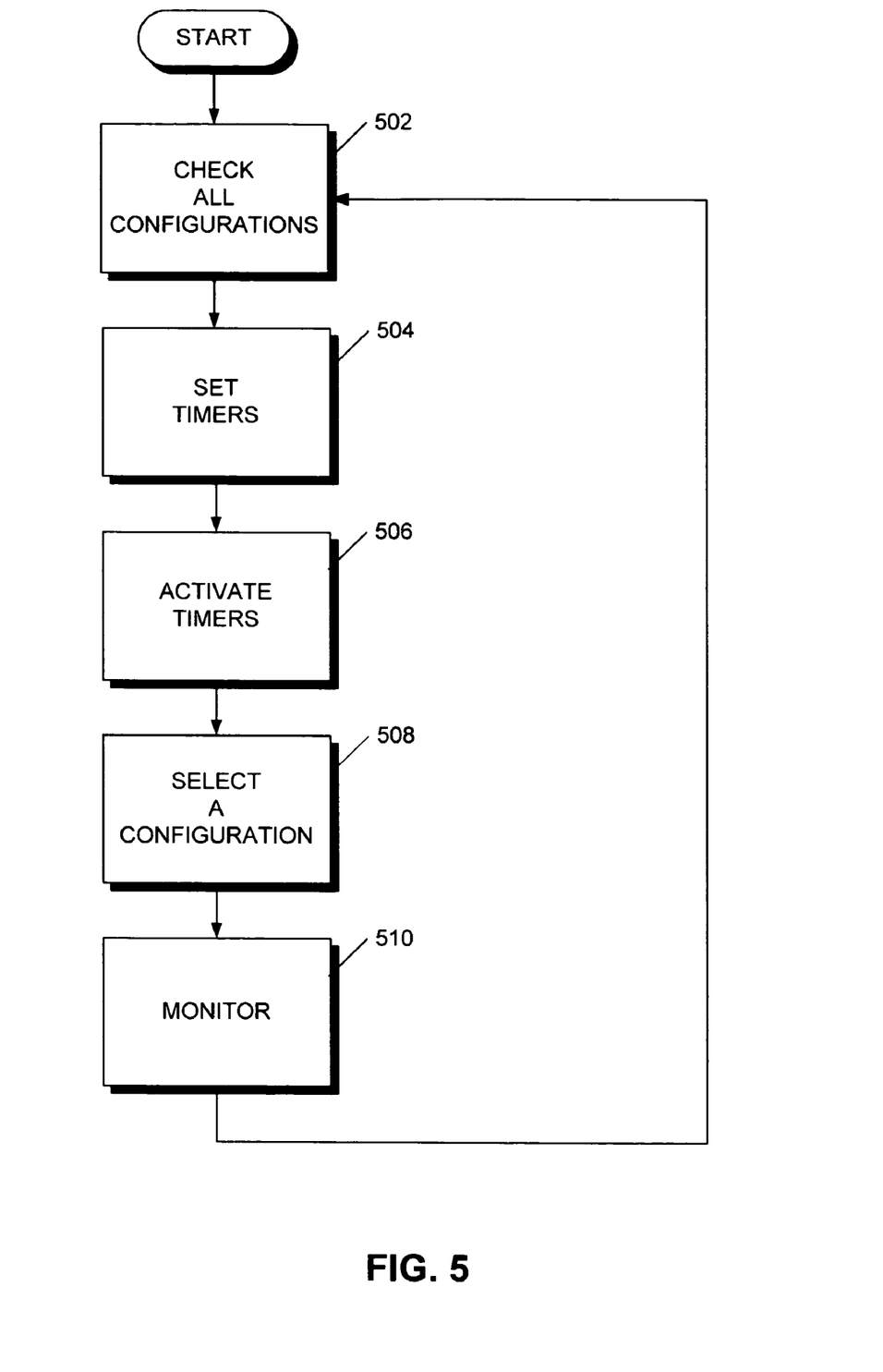
FIG. 5 is a flowchart illustrating another embodiment that uses timers as part of the method for changing antenna configurations in a mobile communication device with multiple antennas.

Still another embodiment using timers is illustrated in FIG. 5. In this embodiment, a timer is associated with each possible antenna configuration. The signal quality for all antenna configurations can be determined in step 502. The length, or time, associated with each of the timers can then be altered, or set, in step 504, based on the signal quality determined for the associated antenna configurations. The timers can then be activated in step 506. The antenna configuration with the best performance can be selected in step 508 and be used to receive signals. The signal quality for that selected antenna configuration can then be monitored as before in step 510.

Each of the other antenna configurations will be excluded for a time period that is related to the signal quality associated with the antenna configuration and defined by the associated timers. Of course, some antenna configurations may not be excluded. The process of FIG. 5 assures that all antenna configurations will eventually be searched but that some will be searched more often.

If the monitored signal level does drop below a certain threshold, then all of the antenna configurations can be checked again to see if one has better signal quality. In addition, depending on the embodiment, the timers can be reset with new values at this time.

Figure 6:
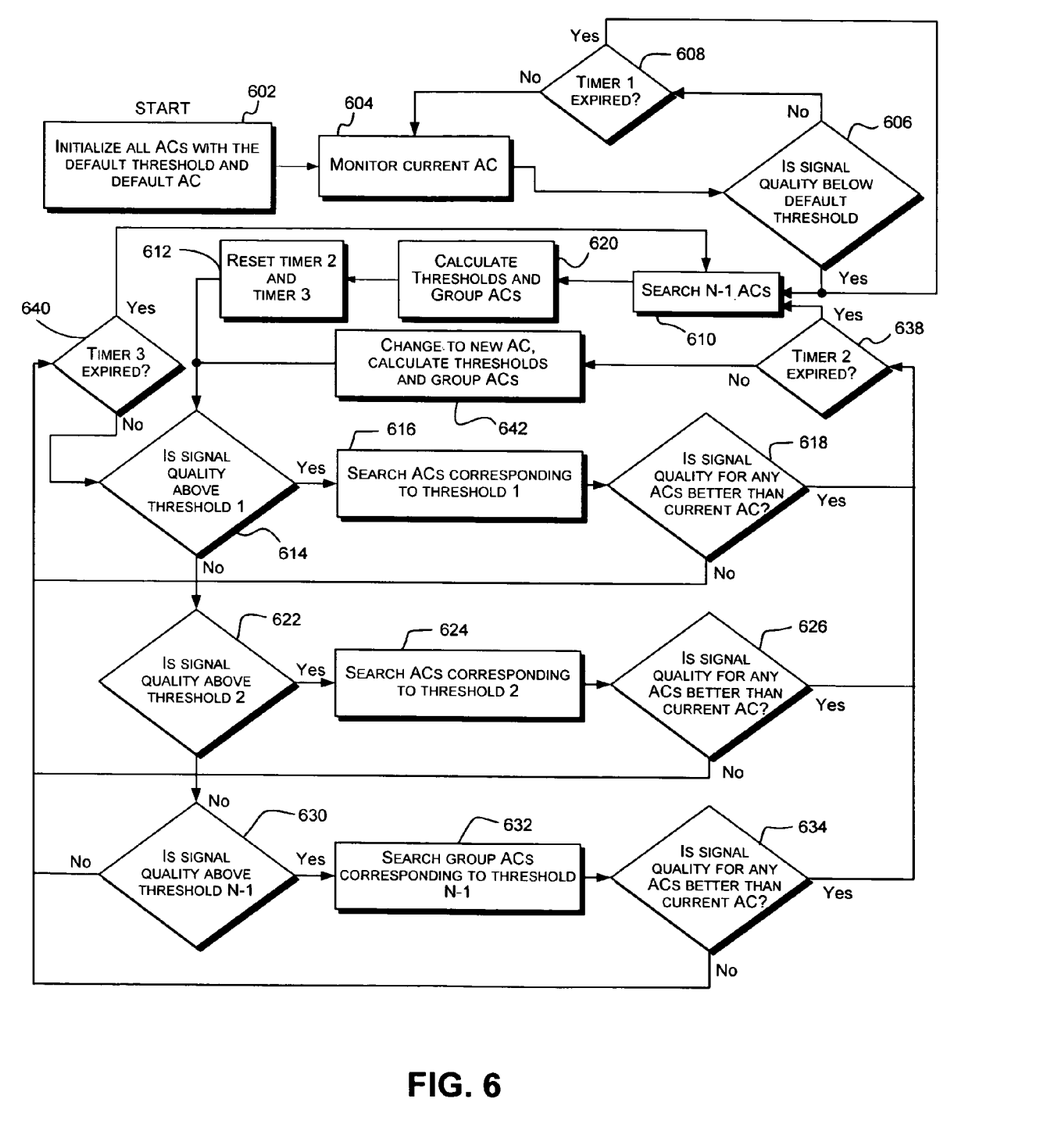
FIG. 6 is a flowchart illustrating another embodiment of a method for changing antenna configurations in a mobile communication device with multiple antennas.

FIG. 6 is a flowchart 600 illustrating an embodiment that uses timers and thresholds as part of the method for changing antennas in a mobile communication device with multiple antennas. Antenna configurations can be grouped based on the signal quality received at each antenna. Timers can be used so that the method does not have to search all of the antenna configurations when the signal quality falls below a threshold.

In step 602, each antenna configuration can be initialized with default threshold values. The current antenna configuration can then be monitored in step 604. In step 606, it can be determined whether the signal quality for the current configuration has dropped below a threshold. In addition, a timer, i.e., timer 1, can be set. If it is determined in step 606 that the signal quality is not below the threshold, then timer 1 can be checked to see if it has expired in step 608. If timer 1 has not expired, then the signal quality can continue to be monitored in step 604.

If timer 1 has expired, in Step 608, or if the signal quality is below the threshold as determined in step 606, then all of the alternative antenna configurations can be searched beginning in step 610. Use of timer 1 in this fashion allows other antenna configurations to be searched periodically, even if the signal quality for the current antenna configuration does not go below the threshold. Since the default threshold needs to be selected based on network configurations and the location of the mobile communication device, it is not always practical to select one default threshold that would work well for all network configurations. Adding a timer, i.e., timer 1, allows other antenna configurations to be searched. The time period associated with timer 1 can vary depending on the requirements of a particular implementation. For example, in certain implementations, it can be undesirable to change antenna configurations, or at least undesirable to change them often. In such embodiments, the length of timer 1 can be made longer. It can also be possible, depending on the embodiment, to update the default thresholds based on the requirements of a particular implementation. For example, in certain embodiments, data from past experience can be used to determine a more optimal default threshold and timer value.

In step 610, the other antenna configurations can be searched and, in step 620, the threshold can be calculated and the antenna configurations can be grouped. The idea is to partition the antenna configurations into multiple groups, e.g., based on signal quality so that not all the antenna configurations need to be searched when comparing against a threshold. For example, only antenna configurations belonging to group 1 need to be searched and compared against threshold 1.

In step 612, timer 2 and timer 3 can be reset. In the embodiment of FIG. 6, multiple thresholds can actually be used. Thus, in step 614, it can be determined if the signal quality, as determined in step 606, is below a first threshold. If the signal quality is above the first threshold, then all antenna configurations associated with this threshold can be searched in step 616. In step 618, it can be determined whether the signal quality for any of the antenna configurations in this group is better than the signal quality determined in step 606 for the current antenna configuration.

If it is determined in step 618, that the signal quality for an antenna configuration in this group is better than the signal quality for the current antenna configuration, then this antenna configuration can be selected in step 642. In addition, however, a second timer (timer 2) can also be used and can be checked in step 638 to determine if it has expired. If it has expired, then all of the antenna configurations can be searched again in step 610 and the timers reset in step 612, instead of selecting the alternative configuration in step 642. Use of timer 2 in this fashion prevents excessive antenna configuration changes.

It should also be noted that in addition to changing the antenna configuration in step 642, all or some of the threshold values can be recalculated. In addition, the transmit power can be monitored to ensure that changing antenna configurations will not cause the maximum transmit power for the mobile communication device to be exceeded. The signal quality for the new antenna configuration can then be monitored.

If it is determined, in step 618, that none of the alternative antenna configurations in the group associated with the first threshold provides better signal quality than the current antenna configuration, then a third timer (timer 3) can then be checked to determine if it has expired. If timer 3 has expired, then all of the antenna configuration can be checked in step 610, regrouped at 620 and the timers reset in step 612. If the signal quality is above the new threshold 1, then all antenna configurations associated with this threshold can be checked in step 616. Timer 3 can be included to prevent an "infinite loop" scenario whereby if the 3 thresholds are chosen too high, the signal quality for the current antenna configuration will never fall below any of the thresholds and none of the other antenna configurations will be searched.

If, at any point, it is determined that the signal quality is not above threshold 1 in step 614, then the other threshold values can be checked, e.g. in step 622 and 630. If the signal quality is above one of these other threshold values, then all the associated antenna configurations can be checked, e.g., in steps 624 and 632, and it can be determined if the signal quality is better for any of these other antenna configurations, e.g., in steps 626 and 634. If the signal quality is not better for any of these other antenna configurations, then timer 3 can be checked in step 640. If the signal quality is better for any of these alternative configurations, then timer 2 can be checked and, depending on the status of timer 2, the alternative configuration with better signal quality can be selected (step 642) or all of the antenna configurations can be searched again (step 610).

It should be noted that each alternative antenna configuration can have its own threshold. Thus, if there are N antenna configurations, and therefore N−1 alternative antenna configurations, then there can be N−1 thresholds to be checked in steps 614, 622, 630, etc. Alternatively, the number of thresholds used can be reduced by ranking and grouping the antenna configurations. In other words, if it is determined, e.g., in step 610, that several of the antenna configurations exhibit similar signal quality, and then they can be grouped and assigned the same threshold. This can further limit the amount of time that the device spends searching alternative configurations, which as explained can actually reduce performance.

As mentioned above, the determination of the signal quality for a given antenna configuration can be based on a plurality of parameters. In certain embodiments, a combination of all or some of these parameters can be used to determine the signal quality. Moreover, these parameters can include forward link as well as reverse link parameters. In certain embodiments, the parameters can be weighted and then combined. The weighting can even vary in certain embodiments, e.g., depending on whether the device is engaged in data or voice communication. In the case of data communication, the Quality of Service (QoS) and forward and reverse link data rates can also be parameters that can be used to determine the signal quality and/or the appropriate weighting associated with various parameters.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A method for selecting an antenna configuration in a mobile communication device, the method comprising:
   monitoring the signal quality for a current antenna configuration of a plurality of antenna configurations;
   searching all of the other antenna configurations of the plurality of antenna configurations when it is determined that the signal quality for the current antenna configuration has passed a threshold;
   selecting the antenna configuration of the plurality of antenna configurations that has the best signal quality;
   determining whether the signal quality for the selected antenna configuration is better than the signal quality for the current antenna configuration; and
   excluding the selected antenna configuration from future searching, when it is determined that the signal quality for the selected antenna configuration is not better than the signal quality for the current antenna configuration.

2. The method of claim 1, further comprising actuating a timer when it is determined that the signal quality for the selected antenna configuration is not better than the signal quality for the current antenna configuration, and continuing to monitor the signal quality for the current antenna configuration.

3. The method of claim 2, further comprising excluding the selected antenna configuration from future searching until the timer has expired.

4. The method of claim 1, further comprising continuing to monitor the signal quality for the current antenna configuration when it is determined that the signal quality for the selected antenna configuration is not better than the signal quality for the current antenna configuration.

5. The method of claim 1, further comprising changing antenna configurations to a new antenna configuration of the plurality of antenna configurations when it is determined that the signal quality for the selected antenna configuration is better than the signal quality for the current antenna configuration.

6. The method of claim 1, further comprises selectively searching a subset of all of the other antenna configurations of the plurality of antenna configurations when the signal quality for the current antenna configuration passes the threshold.

7. The method of claim 6, further comprising changing to the selected antenna configuration when it is determined that the signal quality for the selected antenna configuration is better than the signal quality for the current antenna configuration.

8. The method of claim 7, further comprising altering the threshold when it is determined that the signal quality is not better for the selected antenna configuration, and continuing to monitor the signal quality for the current antenna configuration.

9. A method for selecting an antenna configuration in a mobile communication device, the method comprising:
  monitoring the signal quality for a current antenna configuration of a plurality of antenna configurations;
    selectively searching at least one other antenna configuration from a subset of the plurality of antenna configurations when the signal quality for the current antenna configuration passes a threshold;
    grouping the plurality of antenna configurations and associating each of the groups with one of a plurality of thresholds;
    determining whether the signal quality for the at least one other selectively searched antenna configuration is better than the signal quality for the current antenna configuration; and
    excluding the at least one selectively searched antenna configuration from future searching, when it is determined that the signal quality for the at least one other selectively searched antenna configuration is not better than the signal quality for the current antenna configuration.

10. The method of claim 9, further comprising determining whether the signal quality for the current antenna configuration has passed any one of the plurality of thresholds and, when it determined that the signal quality for the current antenna configuration has passed one of the plurality of thresholds, determining whether the signal quality for one of the antenna configurations from the group associated with that threshold is better than the signal quality for the current antenna configuration.

11. The method of claim 10, further comprising altering at least one of the plurality of thresholds when it is determined that the signal quality is not better for one of the antenna configurations from the group and continuing to monitor the signal quality for the current antenna configuration.

12. A method for selecting an antenna configuration in a mobile communication device, the method comprising:
  monitoring the signal quality for a current antenna configuration of a plurality of antenna configurations;
    selectively searching a subset of the plurality of antenna configurations when the signal quality for the current antenna configuration passes a threshold; and
    altering the threshold when it is determined that none of the searched subset antenna configurations has better signal quality than the current antenna configuration.

13. A mobile communication device comprising:
  a plurality of antenna configurations, each of the plurality of antenna configurations configured to send wireless signals, receive wireless signals, or both;
  a memory configured to store instructions; and
  a processor coupled with the memory, the processor configured to access the memory and execute the instructions, the instructions configured to cause the processor to:
    monitor the signal quality for the current antenna configuration;
    determine that the signal quality for the current antenna configuration has passed a threshold;
    determine whether the signal quality for another antenna configuration of the plurality of antenna configurations is better than the signal quality for the current antenna configuration, when it is determined that the signal quality for the current antenna configuration has passed the threshold;
    alter the threshold when it is determined that the signal quality is not better for any of the other antenna configurations; and
    continue to monitor the signal quality for the current antenna configuration when it is determined that the signal quality for any of the other antenna configurations is not better than the signal quality for the current antenna configuration.

14. The mobile communication device of claim 13, wherein the instructions are further configured to cause the processor to select a new antenna configuration from the plurality of antenna configurations when it is determined that the signal quality for one of the other antenna configurations of the plurality of antenna configurations is better than the signal quality for the current antenna configuration.

15. The mobile communication device of claim 13, wherein the instructions are further configured to cause the processor to:
  monitor the signal quality for all of the other antenna configurations of the plurality of antenna configurations when it is determined that the signal quality for the current antenna configuration has passed the threshold;
  control an antenna configuration control so as to select an antenna configuration of the plurality of antenna configurations that has the best signal quality; and
  determine whether the signal quality for the selected antenna configuration is better than the signal quality for the current antenna configuration.

16. The mobile communication device of claim 15, wherein the instructions are further configured to cause the processor to control a switch so as to switch to the selected antenna configuration when it is determined that the signal quality for the selected antenna configuration is better than the signal quality for the current antenna configuration.

17. The mobile communication device of claim 16, wherein the instructions are further configured to cause the processor to alter the threshold when it is determined that the signal quality for the selected antenna configuration is not better than the signal quality for the current antenna configuration, and continuing to monitor the signal quality for the current antenna configuration.

18. The mobile communication device of claim 17, further comprising a timer, and wherein the instructions are further configured to cause the processor to actuate the timer when it is determined that the signal quality for the selected antenna configuration is not better than the signal quality for the current antenna configuration, and continue to monitor the signal quality for the current antenna configuration.

19. The mobile communication device of claim 18, wherein the instructions are further configured to cause the processor to exclude the selected antenna configurations of the plurality of antenna configurations until the timer has expired.

20. The mobile communication device of claim 13, wherein the instructions are further configured to cause the processor to group the other antenna configurations of the plurality of antenna configurations and associate each of the groups with one of a plurality of thresholds.

21. The mobile communication device of claim 20, wherein the instructions are further configured to cause the processor to determine whether the signal quality for the current antenna configuration has passed any one of the plurality of thresholds and, when it determined that the signal quality for the current antenna configuration has passed one of the plurality of thresholds, determine whether the signal quality for one of the antenna configurations from the group associated with that threshold is better than the signal quality for the current antenna configuration.

22. The mobile communication device of claim 21, wherein the instructions are further configured to cause the processor to alter at least one of the plurality of thresholds when it is determined that the signal quality for one of the antenna configurations from the group is not better than the signal quality for the current antenna configuration, and continue to monitor the signal quality for the current antenna configuration.

* * * * *